INVENTORS.
LELAND D. GREEN
ROBERT W. REYNOLDS
WALDEMAR SAEGER
BY Anthony D. Cennamo
Daniel Rubin
ATTORNEYS INVENTORS.
LELAND D. GREEN
ROBERT W. REYNOLDS
WALDEMAR SAEGER
BY Anthony D. Cennamo
Daniel Rubin
ATTORNEYS

FACSIMILE LINE SKIPPING SYSTEM

INVENTORS.
LELAND D. GREEN
ROBERT W. REYNOLDS
WALDEMAR SAEGER
BY Anthony D. Cennamo
Daniel Rubin
ATTORNEYS INVENTORS.
LELAND D. GREEN
ROBERT W. REYNOLDS
WALDEMAR SAEGER
BY Anthony D. Cennamo
Daniel Rubin
ATTORNEYS INVENTORS.
LELAND D. GREEN
ROBERT W. REYNOLDS
WALDEMAR SAEGER
BY Anthony D. Cennamo
Daniel Rubin
ATTORNEYS United States Patent Office 3,428,744
Patented Feb. 18, 1969

3,428,744
FACSIMILE LINE SKIPPING SYSTEM

Leland D. Green, Pasadena, Robert W. Reynolds, Los Angeles, and Waldemar Saeger, La Canada, Calif., assignors to Xerox Corporation, Rochester, N.Y., a corporation of New York Filed July 14, 1965, Ser. No. 471,799
U.S. Cl. 178—6 10 Claims
Int. Cl. H04n *1/04, 7/00*

ABSTRACT OF THE DISCLOSURE

A facsimile graphic communication system wherein blank lines are automatically skipped at both the transmitter and receiver. The scanner in both the transmitter and receiver has a fast and slow scan capability. Every elemental line of the document or the like which contains information is scanned twice, first with a rapid scan and then with a slow scan, during which video signals are transmitted. Lines bearing no information are merely scanned rapidly once. If a black area is detected during a fast scan, the scanning action reverts to the slow mode. If information is detected during the retrace, then a further slow scan is made and the paper advance signal is withheld until the end of the slow scan.

This application relates to facsimile equipment and more particularly to line skipping means and methods.

Facsimile and television are each concerned with the transmission of images by converting an original multi-dimensional subject into a time-varying signal corresponding to brightness variation along some predetermined scanning raster. Means are provided at the receiving location to reconvert the signal into brightness or density variations along a corresponding scanning raster. It has long been acknowledged that facsimile and television are highly inefficient methods of transmitting information, and particularly printed matter and the like, because the information content of the original subject is typically far less than the information handling capacity of the transmission link which must be provided. A facsimile or television transmission link is capable of transmitting a certain predetermined number of brightness variations in each second, but a typical original subject will contain extensive black and white areas and no signals are generated while such areas are being scanned, thus resulting in the transmission link being idle for a length of time during which it would otherwise be capable of transmitting a large amount of information. Many coding schemes and the like have been proposed to permit the use of transmission links having reduced capacity or to permit the use of existing links while reducing the length of time required to transmit a given image. Such methods have generally been quite complex and poorly suited for use with compact and inexpensive facsimile equipment, or comparable television equipment.

Figure 2:
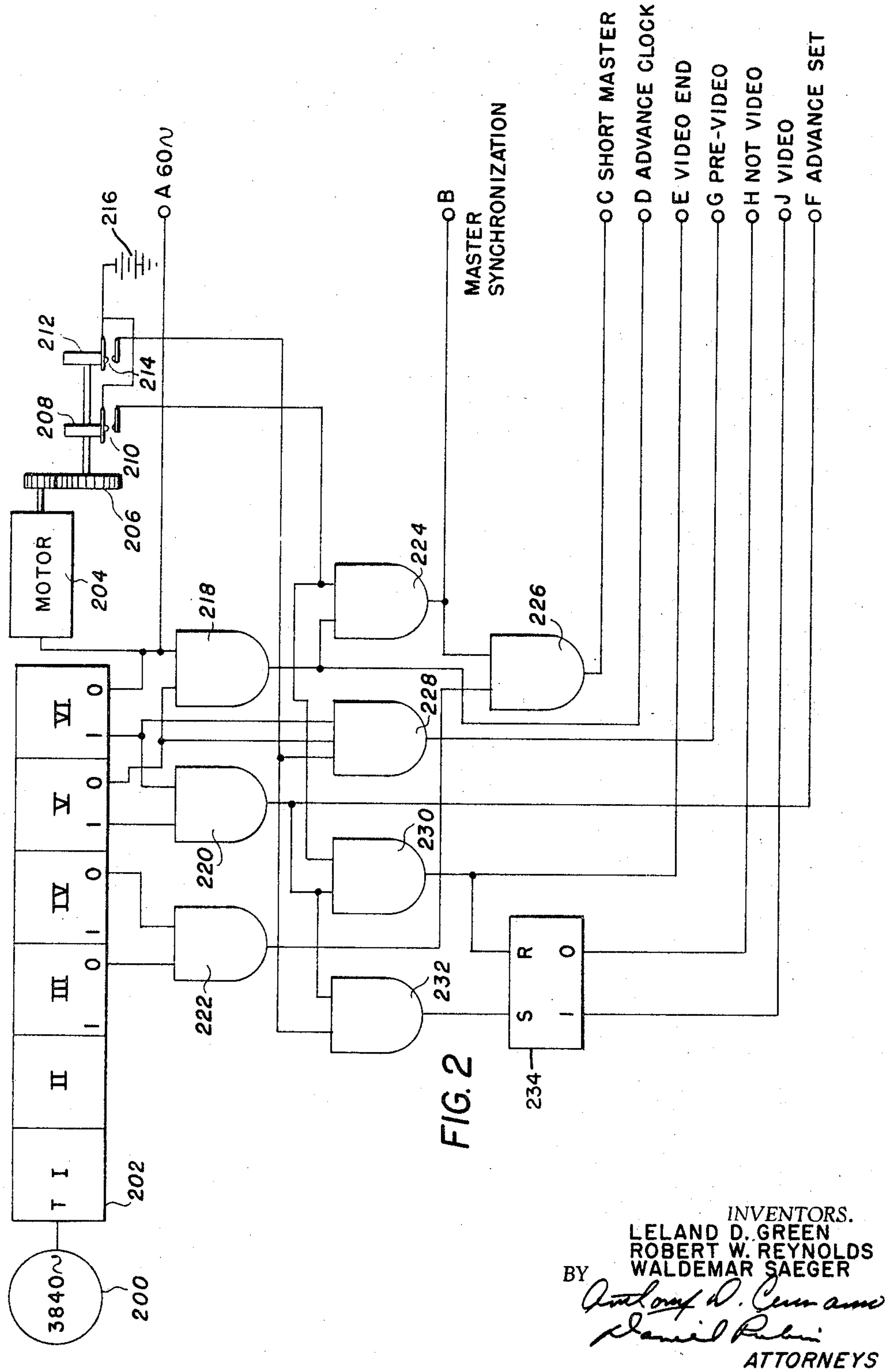
Figure 3:
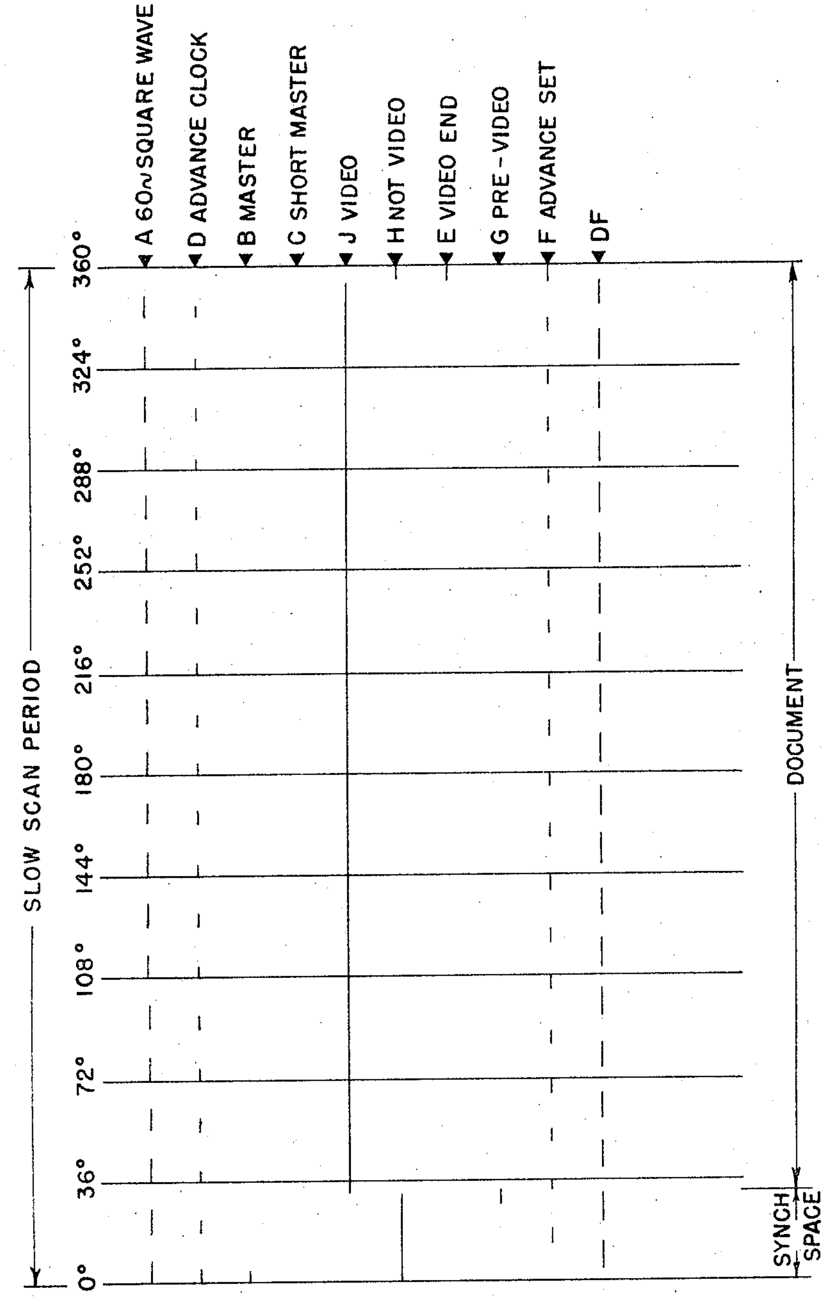
Figure 4:
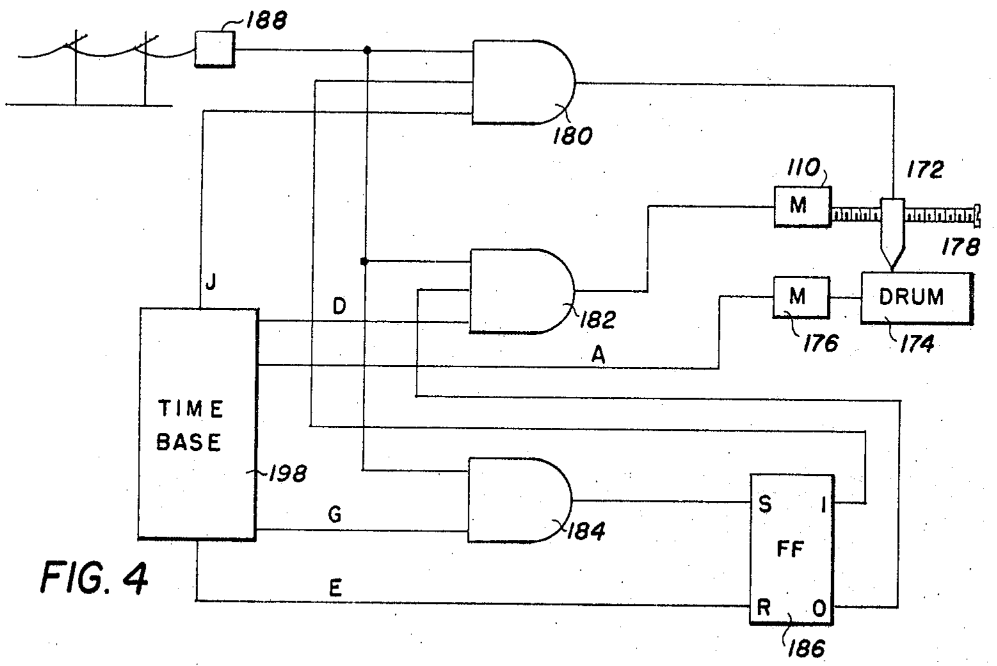
Figure 5:
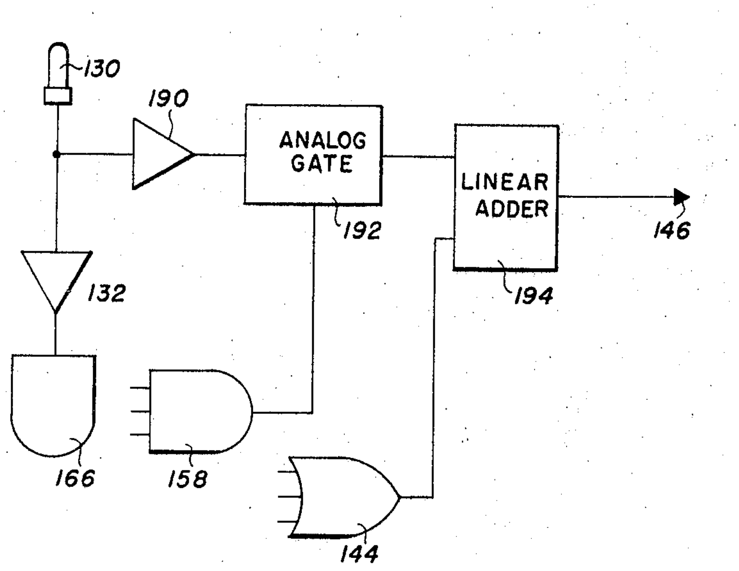
Figure 6:
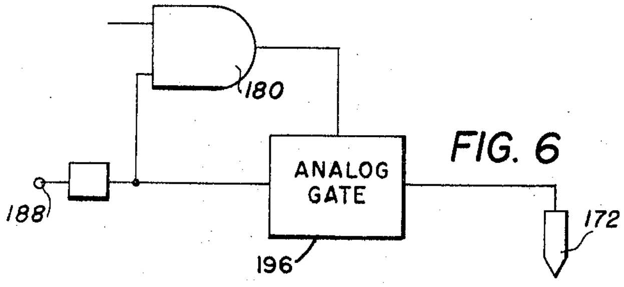
Figure 8:
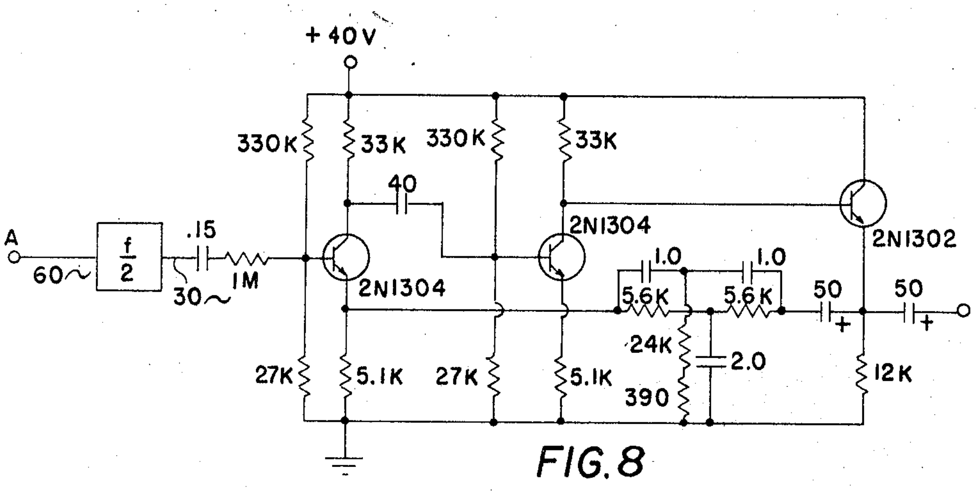
Figure 7:
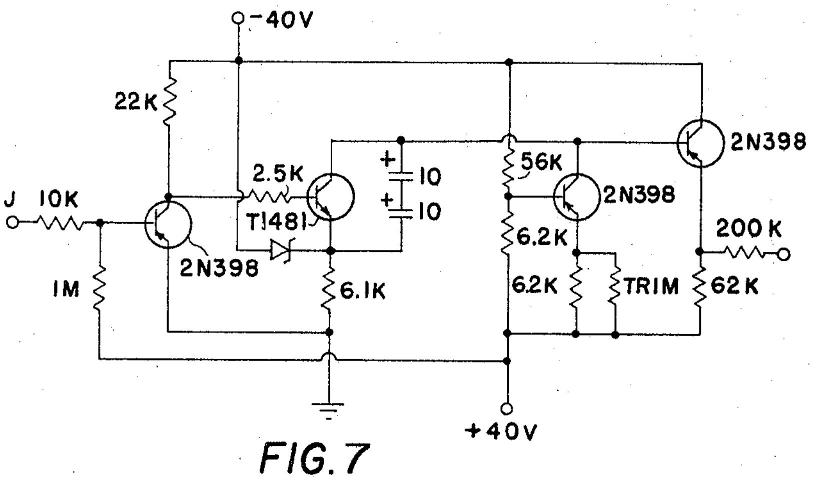

It is accordingly an object of the present invention to provide simple, compact, inexpensive facsimile equipment which is capable of transmitting documents in a reduced length of time. It is a further object to provide facsimile equipment in which blank lines are automatically skipped at both the transmitter and receiver. It is a further object to provide improved methods of automatic line skipping in facsimile transmission. Further objects will become apparent in connection with a more detailed description of the invention and from the drawings in which FIGURE 1 is a schematic diagram of a facsimile transmitter, FIGURE 2 is a schematic diagram of a timing circuit for use with the transmitter of FIGURE 1, FIGURE 3 illustrates the wave forms produced by the circuit of FIGURE 2, FIGURE 4 is a schematic diagram of a facsimile receiver, FIGURE 5 is a partial schematic diagram of a modified facsimile transmitter, FIGURE 6 is a partial schematic diagram of a modified facsimile receiver, and FIGURE 8 is a circuit diagram of a fast scan generator and FIGURE 7 is a circuit diagram of a slow scan generator.

A principal application of facsimile equipment and slow scan television equipment is in the transmission of printed and typewritten documents and letters. It is a distinguishing characteristic of these original subjects that the printing or typing is arranged in substantially horizontal lines. Examination of a typical letter, for example, will show that the lines of typing actually occupy considerably less than half the vertical dimension of the letter, the rest of this dimension being blank and corresponding to spacing between lines as well as blank spaces and the top and bottom of the letter. In a conventional facsimile system all parts of such a letter are scanned at the same uniform speed. Assuming transmission over an ordinary telephone line, it may take on the order of 6 to 15 minutes to transmit an ordinary letter with reasonable resolution. Considering the cost of telephone service, such a long transmission time becomes a serious limitation on the economic usefulness of facsimile equipment.

In accordance with the present invention however, means are provided through which blank horizontal areas of a letter or other original subject are automatically transmitted at a much higher rate than other portions of the letter, whereby the total transmission time required for sending a letter or similar document is reduced by a factor from about 2 to about 6. No evidence of such modified transmission is perceptible in the reproduced document. The objects of the invention are realized while using a single facsimile scanner operating in conjunction with a single photoreceptor. In contrast, however, to conventional facsimile systems, line advance is step-wise rather than continuous and the scanning mechanism is operable at either a normal scanning speed or a very much faster speed. Means are provided whereby such a transmitter and a corresponding receiver are enabled to operate in unison and automatically skip over blank areas of the document being transmitted.

Figure 1:
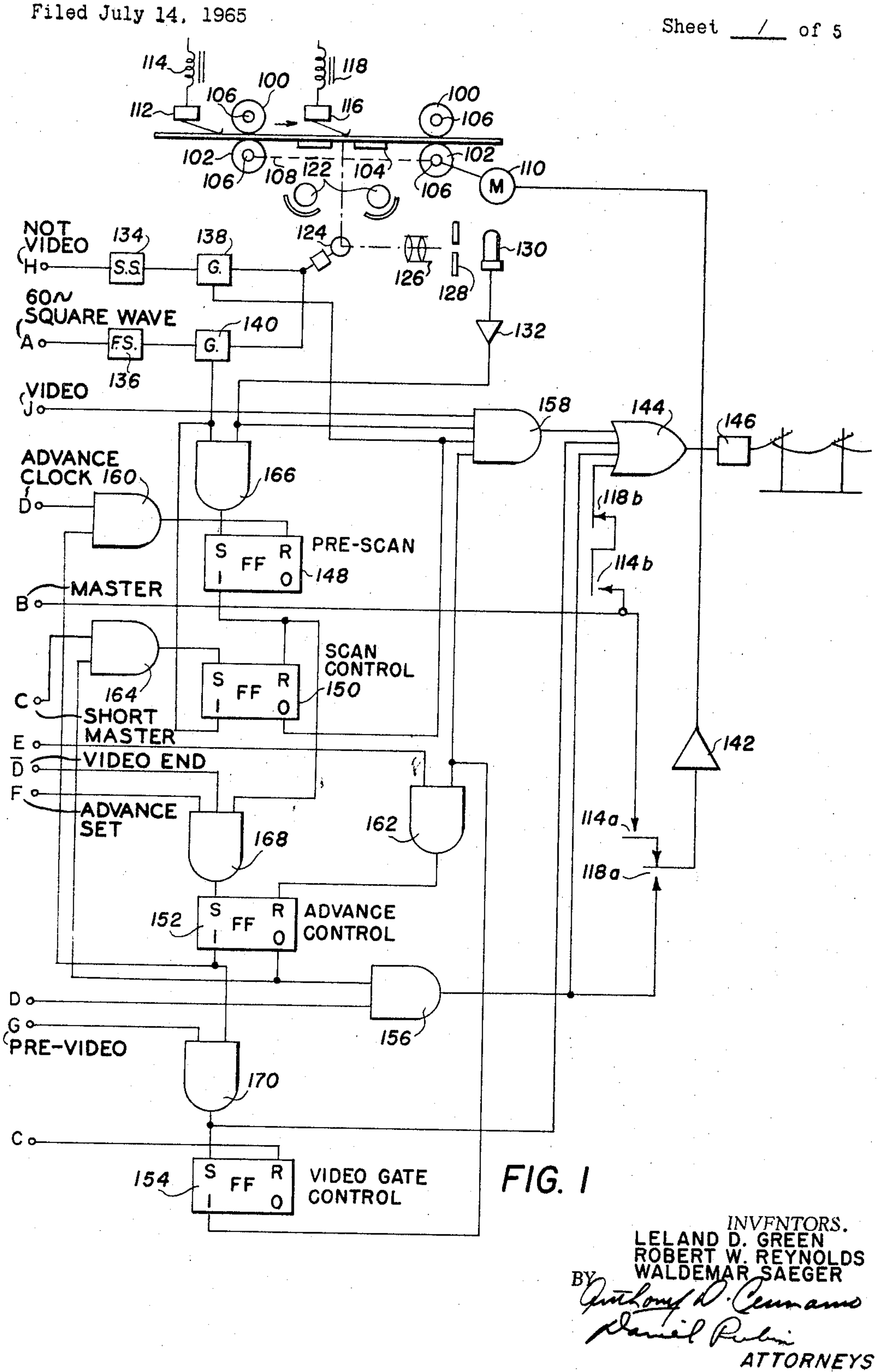

FIGURE 1 shows an illustrative facsimile transmitter according to the invention. A pair of driving rolls 100 co-act with a pair of driven rolls 102 to drive a document over platen 104. Driving rolls 100 are equipped with sprockets 106 so that they may be driven by a chain 108 from stepping motor 110. The stepping motor may be any device which gives a fixed increment of motion, e.g., 0–01″, for each signal received. It may be, for example, an ordinary electrical solenoid associated with a pawl and ratchet drive, a rotary solenoid associated with a one-way drive clutch, the driving mechanism of a conventional stepping relay, or the so-called "Cyclonome" stepping motor sold by Sigma Instruments Incorporated. A first document detector switch 112 is positioned to sense the presence of a sheet of paper as it enters the apparatus and thereupon operates a relay 114. A second detector switch 116 operates a relay 118 and detects the presence of a sheet of paper over a slit 120 in platen 104. The relay contacts, as shown elsewhere in FIGURE 1, bear the same number as the respective relays, and are shown in the position corresponding to the absence of the sheet of paper in the apparatus. A pair of tubular lamps 122 illuminate the document through slit 120 and the light reflected from the document is reflected by a mirror galvanometer 124 to a lens 126 and through aperture 128 to a photomultiplier tube 130, or other photoelectric device. A mirror galvanometer is a conventional device used in analog recorders and the like and includes a small mirror which can be rotated through a certain angular displacement in response to an electrical signal. A suitable device can also be made by cementing a ½ inch diameter mirror to the pen shaft of a pen recording galvometer, catalog No. 428647–920138, manufactured by the Brush Instruments Division of the Clevite Corporation.

Galvanometer 124, lens 126, and aperture 128 collectively deliver to the photomultpilier 130 light coming from a given spot lying within slit 120. This sampling spot can be moved back and forth along the slit by actuating galvanometer 124. A flying spot cathode ray scanner could be used in place of the galvanometer 124 and associated lights, lenses, etc., but only at the cost of a considerable increase in cost, size, and complexity.

Two wave form generators are provided to operate the galvanometer 124. One is a slow scan generator 134 which can illustratively provide a sawtooth wave form. The other is a fast scan generator 136 which illustratively provides a sinusoidal wave form having 10 times the frequency of the slow scan wave form. The slow scan generator is connected to the galvanometer through an analog gate 138 and the fast scan generator is connected to the galvanometer through an analog gate 140. These gates may be conventional electronic devices or simply high speed relays, or even a single double pole relay. Photomultiplier 130 is connected to a squaring amplifier 132 which provides a two level signal corresponding to black or white portions of the document being scanned. The output levels of squaring amplifier 132 should correspond to the "1" and "0" levels of the logic circuitry used in the transmitter.

Before proceeding further with the description of the transmitter apparatus, it is necessary to consider the timing circuits which are separately shown in FIGURE 2 but which should be considered an integral part of the apparatus of FIGURE 1. A 3840-cycle precision oscillator 200 is connected to a six-stage frequency divider 202 consisting of six conventionally cascaded flip-flops I–VI. The voltage appearing at the "0" output of stage VI is a 60-cycle square wave denoted by A. This voltage is used to operate a 60-cycle motor 204 which drives, through 20 to 1 reduction gears 206, a first cam 208 and associated switch 210 and a second cam 212 and associated switch 214. One terminal of each switch is connected to a battery 216 which provides a voltage equal to the logical "1" level used in the transmitter logic circuit. Battery 216 may even represent zero voltage, depending upon the type of logic circuits used. Swtich 210 is closed between 352.5° and 7.5° of cam rotation and switch 214 is closed between 22° and 36° of cam rotation. Optical or magnetic pickups or the like may be used instead of switches 210 and 214.

Pertinent wave forms are illustrated in FIGURE 3 in terms of the angular position of cams 208 and 212 rather than in terms of time. In the stated embodiment, however, it may be noted that one cycle of oscillator 200 corresponds to .26 millisecond and also corresponds to .28 degree of cam rotation. Thus, one degree corresponds to about .93 millisecond.

The "0" outputs of stage V and VI of divider 202 are combined in an AND circuit 218 to produce an output D which is in the "1" state whenever divider 202 registers counts 0 through 15 inclusive. This output, accordingly, appears at 0 to 4.5°; 18° to 22.5°, etc. and is referred to as the advance clock signal. The "1" outputs of stages V and VI of divider 202 are combined in AND circuit 220, the output of which is signal F and is at the "1" level when divider 202 is at counts 48 to 63 inclusive. The F signal accordingly appears at 13.5 to 18.0°; 31.5° to 36.0°, etc. and is referred to as the advance set signal. Signal D is combined in AND circuit 224 with the output of switch 210 to produce a signal B which appears at 0 to 4.5° only, corresponding to counts 0 to 15, and is referred as the master synchronizing signal. The "0" output of stages III and IV of divider 202 are combined in AND circuit 222 to give a signal which is at the "1" level for counts 0 to 3 only. This signal is combined in AND gate 226 with the master synchronizing signal B to produce a signal which appears from 0° to 1.13° only and is referred to as the short master synchronizing signal C. The "0" output of divider stage V and the "1" output of divider stage VI are combined with the output of switch 214 and AND gate 228 to provide a signal G which appears at 27° through 31.5° only, corresponding to counts 32 to 47, and which is referred as to the pre-video signal. The F signal is combined in AND gate 230 with the output of switch 210 and the resulting signal E extends from 355.5° to 0° only, corresponding to counts 48 to 63. This signal is referred to as the video end signal E. The F signal is also combined in AND gate 232 with the output of switch 214. The resulting output signal extends from 31.5° to 36.0° and is applied to the set input of the flip-flop 234 while the reset input of the same flip-flop is connected to signal E. The "1" output of flip-flop 234 is identified as signal J and extends from 31.5° to 355.5° and is referred to as the video signal. It represents an interval in which video signals may be transmitted. The "0" output of flip-flop 234 is signal H, extends from 355.5° to 31.5° and is referred to as the not-video signal H. A further signal is identified in FIGURE 3 as $\overline{DF}$ and is the imaginary signal corresponding to the combined absence of signals D and F as the combined presence of $\overline{D}$ and $\overline{F}$. This signal runs from 4.5° to 13.5°; 22.5° to 31.5, etc. FIGURE 3 illustratively represents a total wave form of 333⅓ milliseconds and corresponds to one slow scan cycle.

Returning to FIGURE 1, it is seen that the wave forms generated in FIGURE 2 are used throughout. Signal H is used to reset slow scan generator 134 which may be a simple electronic integrator circuit as shown in FIGURE 7. Wave form A is divided by 2 and used to time fast scan generator 136 which may be a 30-cycle amplifier and filter as shown in FIGURE 8. Appropriate wave forms are shown in FIGURE 3. It will be appreciated that wave form generators 134 and 138 can conveniently be replaced by rotary potentiometers driven by motor 204 in FIGURE 2 or by appropriate digital to analog converters associated with divider 202 and additional dividers or commutators.

When a sheet of paper is first introduced into the scanner, it closes detector switch 112 which operates relay 114. Closure of contact 114_a_ permits the master synchronizing signal B to be applied through contact 118_a_ to amplifier 142 and thence to stepping motor 110 which is illustratively caused to operate three times per second to advance the paper into the scanning apparatus. At the same time the master synchronizing signal B is applied through contacts 114_b_ and 118_b_ and through OR circuit 144 to the transmitter output terminal 146 from which it may be transmitted by telephone lines or other means to a remote receiver. These transmitted synchronizing impulses can be used to alert a receiver to the impending transmission of video information and can be used to synchronize the receiver to the transmitter timing circuits. When the paper reaches the approximate position of slit 120, it operates detector switch 116 and relay 118. Relay circuits 118_a_ and 118_b_ thereupon disconnect the master synchronizing signal B from the transmitter circuit.

At this stage of operations it is necessary to consider the states of flip-flops 148, 150, 152 and 154. As will be explained later, these flip-flops will initially be in the "0," "1," "0" and "0" states, respectively. With flip-flops 150 in the "1" state, gate 140 will be on and gate 138 will be off and galvanometer 124 will illustratively be driven at the rate of 60 scans per second, alternating left-right and right-left. Assuming that no black areas are encountered in the document being scanned, the states of the flip-flops will remain as described. The "0" output of flip-flop 152 is connected to AND gate 156 and permits advance clock pulses D to pass through gate 156 and OR gate 144 to output terminal or modulator 146 for transmission to a corresponding facsimile receiver. The D signals passing through gate 156 also pass through relay contact 118_a_ to amplifier 142 and thence to stepping motor 110. Under these conditions, a document being scanned is advanced 60 increments per second and the transmitted advance clock signals enable a corresponding paper advance at a connected receiver. Since the "1" output of flip-flop 154 is connected to an input of AND gate 158 and the output of squaring amplifier 132 is also connected to the same gate, video signals cannot pass through gate 158 while flip-flop 154 remains in the "0" state.

It is apparent from FIGURE 1 that the flip-flops must be in the described states prior to the time that a black area is detected in the document being scanned. Thus, if flip-flop 148 is in the "1" state, flip-flop 152 will also be in the "1" state and the next subsequent D signal will be enabled to pass through AND gate 160 and reset flip-flop 148 into the "0" state. The next E signal will be enabled to pass through gate 162 and will reset flip-flop 152 to the "0" state. The next subsequent C pulse will thereupon be able to pass through AND gate 164 to set flip-flop 150 to the "1" state. The C signal will also reset flip-flop 154 to the "0" state, thus bringing all of the flip-flops to the previously described position.

As soon as a black area is detected in the document being scanned, the operation of the facsimile transmitter becomes quite different. The absence or reduction of light falling on photomultiplier 130 causes an output signal to be produced by squaring amplifier 132 which is enabled to pass through AND gate 166 to set flip-flop 148 to the "1" state and thereby reset flip-flop 150 to the "0" state. The new state of flip-flop 150 causes galvanometer 124 to be connected to the slow scan generator 134 rather than the fast scan generator. At the next coincidence of the $\overline{D}$ and $\overline{F}$ signals, the "1" output of flip-flop 148 is enabled to pass through gate 168 to set flip-flop 152 to the "1" state, thereby preventing advance clock signal D from passing through gate 156. At the next appearance of the pre-video signal G the "1" output of flip-flop 152 is enabled to pass through AND gate 170 to set flip-flop 154 to the one condition and at the same time the G signal passes through OR gate 144 to output terminal 146. The "1" output of flip-flop 154 is applied to AND gate 158 and immediately thereafter signal J is also applied to this gate. The combined presence of signal J, the "1" output of flip-flop 154 and the "0" output of flip-flop 150 enables the video signals from squaring amplifier 132 to pass through gates 158 and 144 to output terminal 146. At the end of a slow scan, the video end signal E passes through AND gate 162 and resets flip-flop 152 to the "0" condition, whereby the next advance clock signal D is enabled to pass through gate 156. At the same time, signal C resets flip-flop 154 to the "0" state and is also enabled to pass through gate 164 to set flip-flop 150 to the "1" state and once again enable video signals from squaring amplifier 132 to reach flip-flop 148. Galvanometer 124 is now connected to the fast scan generator 136 which is phased with respect to the slow scan generator so as to provide a rapid retrace following the slow scan. If no black areas are detected during this retrace interval, the galvanometer will continue to be driven by the fast scan generator and advance clock signal D will be transmitted to stepping motor 110 and output terminal 136 after each fast scan. However, as soon as a black area is detected, the circuit of FIGURE 1 will revert to the slow scan mode already described.

The operation of the facimile transmitter can now be described in a simpler way. In the absence of black areas or other marks which the photomultiplier and amplifier are designed to detect, a document will be rapidly scanned alternately from left to right and right to left and will be advanced one increment at the end of each scan. No video information will be transmitted in this condition but characteristic advance signals will be transmitted to permit the paper to be advanced in a facsimile receiver in synchronism with the motion at the transmitter. If a black area is detected during a fast scan, then the paper advance signal is not given and the scanning action reverts to the slow mode. When the scanning mechanism reaches the time and position at which a slow scan is about to commence, a characteristic pre-video alerting signal is transmitted and thereafter the video signals corresponding to the scan are transmitted. At the end of the slow scan, a paper advance signal is transmitted and a rapid retrace is made during which video signals are not transmitted. If information is detected during the retrace, then a further slow scan is made and the paper advance signal is withheld until the end of the slow scan. If no information is detected during the fast scan retrace, then a paper advance signal is given at the end of the retrace and further rapid scans and paper advances are made until such time as black areas or other informtion are detected. In this way, every elemental line of the document which contains information is scanned twice, first with a rapid scan and then with a slow scan during which video signals are transmitted. Lines bearing no information are merely scanned rapidly once. In this way a document can be scanned many times more rapidly than is usual where all areas of the document are scanned at normal speeds compatible with the transmission medium being employed.

In order to form a useful facsimile transmission system, a facsimile transmitter such as that of FIGURE 1 must be used in conjunction with a compatible receiver. A suitable receiver is schematically illustrated in FIGURE 4. It includes a marking head of any conventional type, operating in conjunction with and writing on a continuously rotating recording drum 174 which is driven by a motor 176. Recording head 172 is mounted on a lead screw 178 which is intermittently advanced by a stepping motor 110 which may be the same as stepping motor 110 of FIGURE 1. Other conventional facsimile recorder configurations can also be readily adapted for use in the invention. Drum 174 must rotate in exact synchronism with slow scan generator 134 of FIGURE 1 and time base 198 provides various electrical signals which are synchronized with the corresponding signals of FIGURE 1. Conventional means may be used to synchronize the time base circuit such as that in FIGURE 2 with a remote facsimile transmitter.

When an input pulse G is received at input terminal or demodulator 188 a coincidence is detected at AND gate 184 with the corresponding locally generated G pulse and this coincidence is used to set flip-flop 186 to the "1" state. Thereupon, during the time interval of the J signal, incoming video signals received at input terminal 188 are enabled to pass through AND gate 180 to recording head 172. After a single scan line has been recorded, flip-flop 186 is reset by a locally generated E signal and recording head 172 is thereby disconnected from input terminal 188. An incoming advance clock signal D will generate a coincidence in AND gate 182 with the corresponding local signal and cause stepping motor 110 to advance the recording head by one line. Subsequently received advance clock pulses, if any, will be enabled to operate the stepping motor 110. Receipt of the next pre-video pulse G at terminal 188 will set flip-flop 186 and reconnect recording head 142 to input terminal 188. In this way, an exact facsimile of a transmitted document is recorded on drum 174 even though a two-speed scan is used at the transmitter whereas the recording drum may rotate at a constant speed. Of course, recording could also be effected by an optical scanning system similar to or identical with that of FIGURE 1, in which case receipt of a G signal would be used to initiate a slow scan synchronized with that of the transmitter. However, for recording purposes it is particularly advantageous to use a non-optical system and it then becomes almost essential to employ components rotating at a constant velocity. This becomes possible with the present invention and is a particular advantage of the invention.

The transmitter and receiver have been described as two-level devices, that is devices adapted to generate and receive two video signals only corresponding to black and white. This is preferred for optimum utilization of transmission channels and provides excellent reproduction of typed or printed originals for which the invention is particularly adapted. The invention may, however, readily be adapted for transmission of a wider range of tonal value as may be encountered in transmitting areas of documents containing pictures or the like. FIGURE 5 is a partial schematic showing one way in which the transmitter may be modified. An additional linear amplifier 190 is connected to photomultiplier 130 and the output of this amplifier is connected to the input of an analog gate 192. The output of AND gate 158 is no longer the desired video signal, but instead is used to open analog gate 192. The control signals from OR gate 144 are combined with the video signals from analog gate 192 in a linear adder circuit 194 and applied to output terminal 146. The signals appearing at the output terminal are thus a combination of two-level control signals and multi-level video signals derived from linear amplifier 190.

The corresponding modification may be made in the receiver as shown in FIGURE 6. Input terminal 188 of FIGURE 4 is also connected to the input of an analog gate 196, the output of which is connected to recording head 172, instead of to gate 180, which is now a two-input gate. Gate 180 controls analog gate 196 and permits incoming multi-level signals to be passed at appropriate times to recording head 172.

FIGURE 8 is a circuit diagram of a suitable fast scan generator for use as element 136 of FIGURE 1, although as noted previously an electromechanical device could also be used. The circuit divides the 60-cycle square wave A by a factor of 2 to produce a 30-cycle square wave which is converted to a 30-cycle sine wave. In essence, the generator consists of a three-stage active filter using a twin T network for frequency discrimination. Rejection of harmonics present in the input square wave results in a pure sine wave output. It may be desirable to provide additional voltage amplification following the circuit. FIGURE 7 shows a circuit diagram of a suitable slow scan generator 138. The circuit generates a voltage ramp by constant current charging of the capacitor. Periodic resetting is achieved by discharging the capacitor through a saturated transistor. To avoid undue loading of the charging network, an emitter follower output is utilized.

The invention has been described in terms of a specific embodiment, but many alternative forms of apparatus will be obvious to those skilled in the art for accomplishing the results of the invention while following the teaching embodied herein. Thus, the particular forms of apparatus employed for scanning and recording purposes may be replaced by other known forms of apparatus provided only that the scanner is capable of multiple speed operation and that both scanner and recorder are adaptable to controlled intermittent rather than continuous advance. Where cathode ray tube or other non-mechanical scanners are employed, all scans may conveniently be in the same direction. The retract after a slow scan, where employed, may be provided by the slow scan generator itself. The particular set of internal control signals described herein are obviously not unique nor are the externally transmitted control signals. Signals must, however, be generated at the facsimile transmitter and identified at the facsimile receiver which are adequate to control the receiver stepper in synchronism with the transmitter stepper. The speed ratios between fast and slow scans may be varied. The 60 scans per second illustratively described herein can be achieved with electromechanical scanners, but a somewhat lower speed may be preferred when operating over low quality telephone lines, due to their limited transmission capability. The particular logical circuitry employed is subject to wide variations and may be adapted in accordance with generally understood principles for use with different types of logical gates or with different sets of internal control signals or the like.

Accordingly, the invention is to be interpreted broadly in terms of basic concepts except as limited by the following claims.

What is claimed is:

1. A facsimile transmitter comprising:

scanning means to scan a sampling spot in a line across a subject to be transmitted and to generate an electrical video signal related to the subject brightness corresponding to said spot, said scanning means being adapted to operate in either a slow scan mode or in a fast scan mode, the speed of said fast scan mode being at least twice that of said slow scan mode, advance means to advance said line in uniform increments in a direction substantially perpendicular to said line, means responsive to the detection of video intelligence during a fast scan to transfer said scanning means to the slow scan mode, means to transfer said scanning means to the fast scan mode at the end of each slow scan, means to transmit only video signals generated during said slow scans, means to operate said advance means at the end of each slow scan and at the end of each fast scan in which no video intelligence is detected, and means to transmit an advance signal indicative of the operation of said advance means.

2. A facsimile transmitter comprising:

scanning means to scan a sampling spot in a line across a subject to be transmitted and to generate an electrical video signal related to the subject brightness corresponding to said spot, said scanning means being adapted to operate in either a uni-directional slow scan mode or in a bi-directional fast scan mode, the speed of said fast scan mode being at least twice that of said slow scan mode, advance means to advance said line in uniform increments in a direction substantially perpendicular to said line, means responsive to the detection of video intelligence during a fast scan to transfer said scanning means to the slow scan mode, means to transfer said scanning means to the fast scan mode at the end of each slow scan, means to operate said advance means at the end of each slow scan and at the end of each fast scan in which no video intelligence is detected, means to generate an advance signal indicative of the operation of said advance means, means to generate a prevideo signal indicative of a forthcoming slow scan, and means to combine said advance signal and said prevideo signal with said video signal generated during said slow scans to form a single composite signal.

3. The apparatus of claim 2 in which said scans, said advance signal, and said prevideo signal are restricted to predetermined time slots.

4. The apparatus of claim 2 further including means to initially generate a sequence of advance signals prior to generating video signals.

5. The apparatus of claim 2 in which said fast scans occur at twenty times the rate of said slow scans.

6. A facsimile receiver comprising:

continuously operating scan means to repetitively scan a marking element at uniform velocity in a line across a recording medium in recording relationship therewith, advance means to intermittently advance said line in fixed increments in a direction substantially perpendicular to itself, means to operate said advance means only in response to received advance signals, means to connect received video signals to said marking element only following received prevideo signals and for a length of time corresponding to one scan, said receiver being adapted to identify said advance, video and prevideo signals in a single transmission channel by their time relations to a recurrent time base synchronized with said scan means.

7. The time conserving method of facsimile transmission comprising:

line scanning an original subject with a multi-speed facsimile scanner so that each scan line is first scanned at a high speed, rescanning at low speed each line in which intelligence is detected, scanning the next line at high speed after each slow scan and after each fast scan in which no intelligence is detected, generating an advance signal corresponding to each scan line advance, transmitting each of said signals to a facsimile receiver, incrementally advancing the receiver scan solely in response to said advance signals.

8. An image reproduction system including, a transmitter comprising, scanning means to scan a sampling spot in a line across a subject to be transmitted and to generate an electrical video signal related to the subject brightness corresponding to said spot, said scanning means being adapted to operate in either a uni-directional slow scan mode or in a bi-directional fast scan mode, the speed of said fast scan mode being at least twice that of said slow scan mode, advance means to advance said line in uniform increments in a direction substantially perpendicular to said line, means responsive to the detection of video intelligence during a fast scan to transfer said scanning means to the slow scan mode, means to transfer said scanning means to the fast scan mode at the end of each slow scan, means to operate said advance means at the end of each slow scan and at the end of each fast scan in which no video intelligence is detected, means to generate an advance signal indicative of the operation of said stepping means, means to generate a prevideo signal indicative of a forthcoming slow scan, a receiver, means to transmit said signals to said receiver, continuously operating scan means at said receiver to repetitively scan a recording element at uniform velocity in a line across a recording medium in recording relationship therewith, advance means to intermittently advance said line in fixed increments in a direction substantially perpendicular to itself, means to operate said advance means only in response to received advance signals, means to connect received video signals to said recording element only following received prevideo signals and for a length of time corresponding to one scan, said receiver being adapted to identify said advance and prevideo signals by their time relation to a recurrent time base synchronized with said scan means.

9. The time conserving method of facsimile transmission comprising:

line scanning an original subject with a multi-speed facsimile scanner so that each scan line is first scanned at a high speed, rescanning at low speed each line in which intelligence is detected, scanning the next line at high speed after after each slow scan and after each fast scan in which no intelligence is detected, generating an advance signal corresponding to each scan line advance, generating a prevideo signal corresponding to each transition from fast scan to slow scan, transmitting each of said signals to a facsimile receiver, detecting the advance signals at said receiver and incrementally advancing the receiver scan in response to said advance signals, detecting the prevideo signals at said receiver and in response thereto recording only said slow scan at said receiver.

10. The method of claim 9 in which said scans, said advance signals, and said prevideo signals are restricted to predetermined repetitive time intervals.

References Cited

UNITED STATES PATENTS 3,201,512 8/1965 Mason ---------------- 178—6

ROBERT L. GRIFFIN, *Primary Examiner.*

H. W. BRITTON, *Assistant Examiner.*

U.S. Cl. X.R.

178—6.6